(12) United States Patent
Wang et al.

(10) Patent No.: US 9,276,694 B2
(45) Date of Patent: Mar. 1, 2016

(54) FAULT RECOVERY IN BRANCHED OPTICAL NETWORKS

(71) Applicant: TYCO ELECTRONICS SUBSEA COMMUNICATIONS LLC, Eatontown, NJ (US)

(72) Inventors: Hongsheng Wang, Bound Brook, NJ (US); Dmitriy Kovsh, Hoboken, NJ (US); Lutfur Rahman, Ocean, NJ (US); Ruomei Mu, East Brunswick, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 13/841,619

(22) Filed: Mar. 15, 2013

(65) Prior Publication Data

US 2014/0099098 A1    Apr. 10, 2014

Related U.S. Application Data

(60) Provisional application No. 61/711,165, filed on Oct. 8, 2012.

(51) Int. Cl.
*H04J 14/00* (2006.01)
*H04J 14/02* (2006.01)

(52) U.S. Cl.
CPC ......... *H04J 14/0201* (2013.01); *H04J 14/0221* (2013.01); *H04J 14/0227* (2013.01); *H04J 14/0204* (2013.01); *H04J 14/0205* (2013.01); *H04J 14/0206* (2013.01); *H04J 14/0213* (2013.01)

(58) Field of Classification Search
CPC ............... H04J 14/0221; H04J 14/0201; H04J 14/0287; H04J 14/021; H04J 14/0227; H04J 14/02; H04J 14/0206; H04Q 11/0016

USPC ................ 398/1–8, 34, 38, 26, 27, 82, 83, 94
See application file for complete search history.

(56) References Cited

U.S. PATENT DOCUMENTS

| | | | | |
|---|---|---|---|---|
| 6,701,087 B2* | 3/2004 | Beine et al. | | 398/38 |
| 7,430,373 B2* | 9/2008 | Yamashita | | 398/83 |
| 7,725,034 B2* | 5/2010 | Uda et al. | | 398/97 |
| 7,826,746 B2* | 11/2010 | Stango et al. | | 398/79 |
| 8,068,735 B2* | 11/2011 | Stango et al. | | 398/79 |
| 8,290,361 B2* | 10/2012 | Nakano | | 398/9 |
| 8,401,391 B2* | 3/2013 | Kovsh et al. | | 398/83 |
| 8,401,392 B2* | 3/2013 | Kovsh et al. | | 398/83 |
| 8,554,081 B2* | 10/2013 | Kovsh et al. | | 398/83 |
| 8,676,053 B2* | 3/2014 | Wang et al. | | 398/37 |
| 2003/0053163 A1 | 3/2003 | Li et al. | | |
| 2005/0286905 A1 | 12/2005 | Mohs et al. | | |
| 2006/0051093 A1 | 3/2006 | Manna | | |
| 2011/0026925 A1 | 2/2011 | Mu et al. | | |
| 2011/0311216 A1* | 12/2011 | Inoue | | 398/1 |
| 2012/0243879 A1* | 9/2012 | Nashimoto et al. | | 398/140 |
| 2013/0028597 A1* | 1/2013 | Ye et al. | | 398/26 |

OTHER PUBLICATIONS

International Search Report issued in related application PCT/US2013/063207 completed on Dec. 17, 2013.
Turukhin et al.; "Faults and Recovery Methods in Regional Undersea OADM Networks"; ECOC 2009, Sep. 20-24, 2009, Vienna, Austria, Paper P4.19, 2 pages.
Akhtar et al.; "First Field Demonstration of Fault Resilience in a Regional Undersea OADM Network"; OFC/NFOEC Technical Digest, 2012 OSA, 3 pages.

* cited by examiner

*Primary Examiner* — Hibret Woldekidan

(57) ABSTRACT

A system and method for fault recovery in a branched optical network. In response to a fault, power distribution in channels on recovering digital line segments is adjusted to minimize a merit function based on one or more system parameters.

13 Claims, 4 Drawing Sheets

FAULT RECOVERY IN BRANCHED OPTICAL NETWORKS

CROSS-REFERENCE TO RELATED APPLICATIONS

This application claims the benefit of the filing date of U.S. Provisional Application Ser. No. 61/711,165 filed Oct. 8, 2012, the teachings of which are hereby incorporated herein by reference.

TECHNICAL FIELD

The present application relates to the optical transmission of information and, more particularly, to fault recovery in branched optical networks.

BACKGROUND

To maximize the transmission capacity of an optical fiber transmission system, a single optical fiber may be used to carry multiple optical signals in what is called a wavelength division multiplexed system (hereinafter a WDM system). The multiple optical signals may be multiplexed to form a multiplexed signal or WDM signal with each of the multiple signals being modulated on separate wavelengths referred to as channels. The channels are positioned relative to each other on a grid, e.g. as defined by the International Telecommunication Union (ITU), with an associated pre-defined channel spacing. Modern WDM systems have a high traffic capacity, for example, a capacity to carry 126 channels or more at 40 gigabits per second (hereinafter Gb/s) or more.

The optical fiber transmission system may include a relatively long trunk fiber segment that may be terminated at a transmitting and/or receiving trunk terminal. The optical fiber transmission system may further include one or more branching units situated along its trunk. Each branching unit (BU) may be connected to a branch fiber segment that terminates in a transmitting and/or receiving branch terminal. Each BU may include one or more optical add/drop multiplexers (OADM). Channels may be added to and/or dropped from the trunk fiber segment of the optical transmission system via the OADMs.

In WDM undersea optical networks, the deployment of OADM elements greatly increases the flexibility of network topology and traffic distribution. The ability to connect multiple stations via the same fiber pair (FP) by sharing and reusing bandwidth between different digital line segments (DLSs) is attractive to network operators due to its reduced system cost. Each DLS consists of a group of channels on an OADM FP that share the same transmit and receive terminals.

When information signals are transmitted over long distances, one or more amplifiers, e.g. erbium-doped fiber amplifiers (EDFAs), are provided to compensate for signal attenuation. The amplifiers used in some WDM systems (e.g., undersea systems) cannot easily be modified once installed and are initially configured to support a fully loaded system. In general, it may be desirable that the power per-channel be sufficient to provide an adequate signal-to-noise ratio in the presence of the amplified spontaneous emission (ASE) noise from the amplifiers, necessitating a high amplifier total output power for systems with high fully-loaded capacity. The amplifiers may thus be configured to provide an optical output signal at a nominal total optical power. As used herein, use of the term "nominal" or "nominally" when referring to an amount means a designated or theoretical amount that may vary from the actual amount.

The nominal amplifier output power level may be insensitive to the power at the input of the amplifier. As the amplifier input power varies over a wide range, the total amplifier output power may change very little around the nominal output power level. As additional channels are added, e.g. at a branching unit, the optical output power per channel may decrease. As channels are dropped, the optical output power per channel may increase.

Optical signals, while propagating through optical fibers, can experience nonlinear interaction. At sufficiently high values of optical power (e.g., more than 1 mW per channel), the optical signal may experience more distortion than at low optical powers (e.g., less than 1 mW per channel) which results in transmission penalty. Therefore, when channels are dropped, e.g., at a branching unit, the value of optical channel power may increase, and network communication performance may suffer. Partial channel loading of a chain of optical amplifiers may result in undesirable noise accumulation in parts of the transmission band and gain reshaping effects that also degrade channel performance.

If a cable fault occurs due to fiber cut or component failure, the fault interrupts traffic on all DLSs that pass through the location of such fault. Additionally, changes in channel power distribution will impact the performance of other DLSs on the same FP that are not directly affected by the cut. The severity of the impact depends on a number of factors, such as DLS length, wavelength allocation, properties of optical amplifiers and terminal equipment. Some channels on remaining DLSs may suffer performance penalties that will cause interruption of customer traffic. Unlike terrestrial networks, submarine systems may not be designed to have an alternative path to which traffic may be routed in case of a fault and thus may rely on a recovery mechanism to restore the performance of as many channels on the OADM FP as possible.

BRIEF DESCRIPTION OF THE DRAWINGS

Reference should be made to the following detailed description which should be read in conjunction with the following figures, wherein like numerals represent like parts.

DETAILED DESCRIPTION

In general, a fault recovery system and method consistent with the present disclosure involves an adjustment of power distribution in transmitted channels in response to a fault in an optical communication network. The adjustment may be determined by adjusting transmitter power ratios in a manner that minimizes a merit function. The merit function may be based on one or more system parameters, such as optical signal-to-noise ratio at the receiver and total accumulated nonlinear phase shift.

Figure 1:
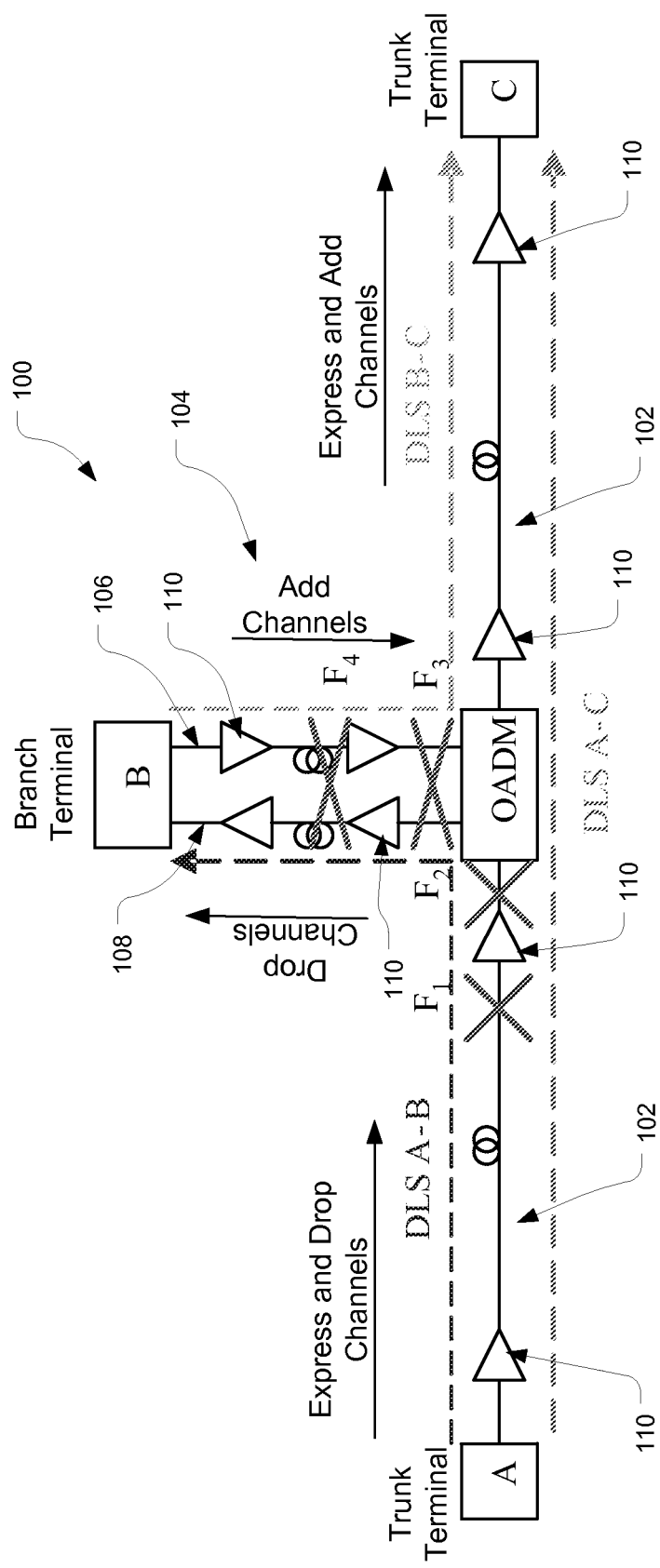
FIG. 1 is a block diagram of one exemplary embodiment of a system consistent with the present disclosure.

Turning now to FIG. 1, there is illustrated an exemplary optical communication system 100 consistent with the present disclosure. The system 100 includes a first trunk terminal A, a branch terminal B, a second trunk terminal C, and an optical add-drop multiplexer (OADM). Terminals A and C are coupled to each other through a trunk path 102, and terminal B is coupled to the trunk path 102 by a branch path 104 including a branch add path 106 and a branch drop path 108. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 102 and branch paths 104 may include one or more sections of optical fiber cable including optical fiber pairs and one or more repeaters 110 to provide bi-directional communication of WDM channels between terminals A, B and/or C. A WDM signal may originate at terminal A, B and/or C and may be received at any terminal A, B and/or C. The illustrated system thus includes a DLS between terminals A and C, shown in dashed lines and labeled DLS A-C, a DLS between terminals A and B, shown in dashed lines and labeled DLS A-B, and a DLS between terminals B and C, shown in dashed lines and labeled DLS B-C.

Those of ordinary skill in the art will recognize that the system 100 has been depicted in highly simplified form for ease of explanation. A system consistent with the present disclosure may include any number of branch terminals and OADMs to establish any number of DLSs. Also, for ease of explanation the description herein may refer to transmission from one terminal to another. It is to be understood, however, that a system consistent with the present disclosure may be configured for bi-directional or uni-directional communication between any of the terminals A, B and/or C.

The components in the trunk 102 and branch 104 paths may include known configurations for achieving their intended functionality. The repeaters 110, for example, may include any known optical amplifier/repeater configuration that compensates for signal attenuation on the transmission path. For example, one or more of the repeaters 110 may be configured as an optical amplifier, such as an erbium doped fiber amplifier (EDFA), a Raman amplifier, or a hybrid Raman/EDFA amplifier. Also, the system 100 may be configured as a long-haul system, e.g. having a length between at least two of the terminals A, B, C of more than about 600 km, and may span a body of water. When used to span a body of water, e.g. an ocean, amplifiers 110 and/or the OADM may be seated on the ocean floor and the trunk path 102 and/or branch path 104 may span between beach landings.

In general, the OADM may be configured to drop channels from the trunk path 102 to the branch drop path 108 and to add channels from the branch add path 106 to the trunk path 102. The OADM may also be configured to pass express channels from trunk terminal A to trunk terminal C. For example, terminal A may transmit express channels and drop channels to the OADM. The OADM may pass the drop channels to the branch drop path 108 and pass the express channels along to the trunk path 102 toward terminal C. The branch terminal may transmit add channels on the branch add path 106 and the OADM may add the add channels onto the trunk path 102 toward terminal C along with the express channels transmitted from terminal A. A wide variety of OADM configurations for adding, dropping and passing channels between terminals A, B and/or C are well known to those of ordinary skill in the art.

Figure 2:
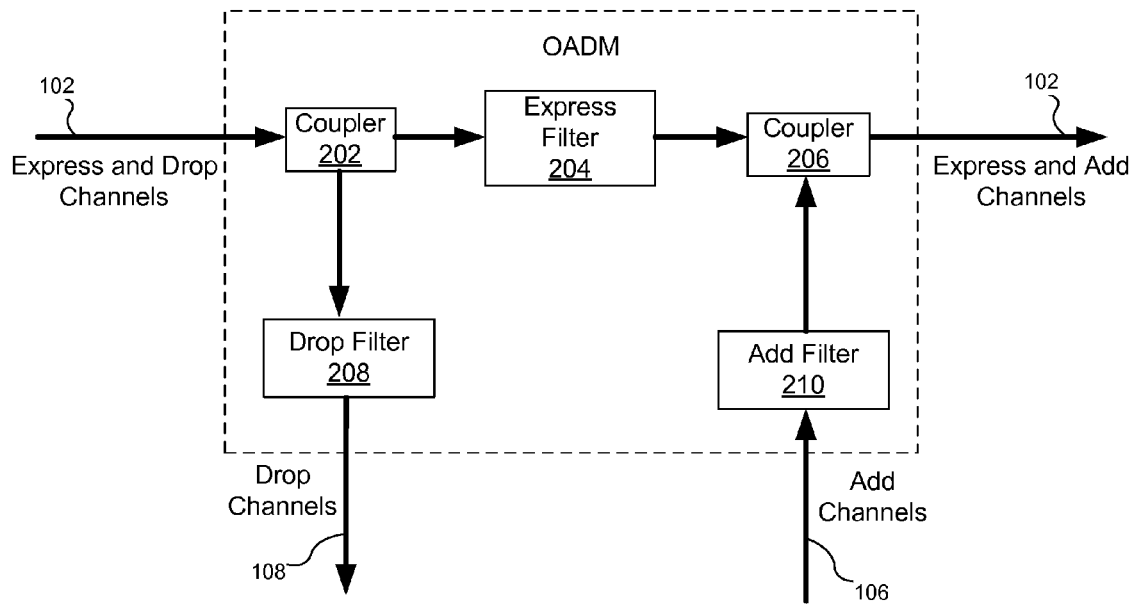
FIG. 2 diagrammatically illustrates operation of an exemplary optical add-drop multiplexer in a system consistent with the present disclosure.

FIG. 2 diagrammatically illustrates one example of an OADM useful in a system consistent with the present disclosure. The illustrated exemplary embodiment, includes a drop filter 208 for passing drop channels from the trunk path 102 to the branch drop path 108, an add filter 210 for passing add channels from the branch add path 106 to the trunk path 102, and an express filter 204 for allowing express channels on the trunk path 102 to pass through the OADM. A first coupler 202 couples the express and drop channels on the trunk path 102 to the express filter 204 and the drop filter 208. A second coupler 206 couples the output of the express filter 204 and the output of the add filter 210 to provide the express and add channels on the trunk path 102.

The add filter 210, drop filter 208 and express filter 204 are shown in FIG. 2 to conceptually illustrate operation of the OADM in a simplified form for ease of illustration. The functionality indicated by the add filter 210, drop filter 208 and/or express filter 204 may be implemented in a variety of configurations, e.g. using optical switches, filters, couplers, etc., and may be selectively adjustable to allow modification of the add, drop and express channel allocations. A system consistent with the present disclosure may be implemented using any OADM configuration.

Figure 3:
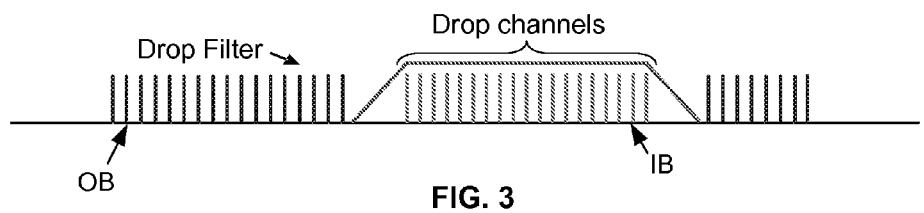
FIG. 3 illustrates an exemplary transmittance characteristic for a drop filter useful in connection with a branching configuration consistent with the present disclosure.
Figure 4:
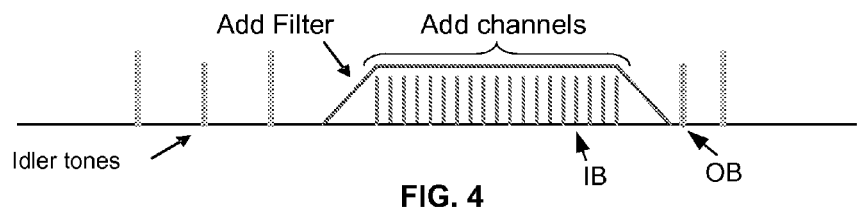
FIG. 4 illustrates an exemplary transmittance characteristic for an add filter useful in connection with a branching configuration consistent with the present disclosure.
Figure 5:
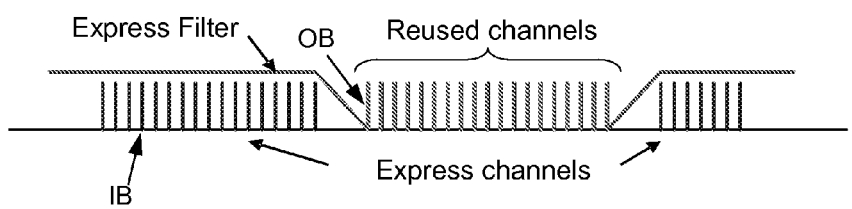
FIG. 5 illustrates an exemplary transmittance characteristic for an express filter useful in connection with a branching configuration consistent with the present disclosure.

FIG. 3 diagrammatically illustrates the transmittance vs. wavelength for the drop filter 208 shown in FIG. 2. The drop filter 208 may be a band pass filter configuration that passes drop channels from the trunk path 102 to the branch drop path 108, e.g. through coupler 202, and blocks express channels. FIG. 4 diagrammatically illustrates the transmittance vs. wavelength for the add filter 210 shown in FIG. 2. The add filter 210 may be a band pass filter configuration that passes add channels from the branch add path 106 to the trunk path 102, e.g. through coupler 206. FIG. 5 diagrammatically illustrates the transmittance vs. wavelength for the express filter 204 shown in FIG. 2. The express filter 204 may be a filter configuration that passes express channels through the OADM to the trunk path 102 and rejects one or more channel wavelengths corresponding to location of the add channels. The wavelengths that are rejected by the express filter 204 may be the same wavelengths occupied by the drop channels on the trunk path 102. Thus, the same wavelengths used for the drop channels being dropped at the OADM may be made available to receive the add channels from the OADM.

Channels that are passed by the drop filter 208, add filter 210, or the express filter 204 are referred to herein as in-band (IB) channels. Channels that are blocked by the drop filter 208, add filter 210, or express filter 204 are referred to herein as out-of-band (OB) channels. With reference to FIGS. 3, 4 and 5, for example, channels labeled IB are examples of IB channels with respect to the respective filters, and channels labeled OB are examples of OB channels with respect to the respective filters.

Any of the channels transmitted by terminals A, B or C may be a utilized or an unutilized channel. As used herein, "utilized channels" refer to WDM system channel locations that contain information carrying signals and "unutilized channels" refer to WDM system channel locations that do not contain information carrying signals. In order to maintain a desired channel loading, unutilized channels may be loaded at terminals A, B, or C with loading signals. As used herein "loading signal" refers to a non-information carrying signal such as broadband noise, e.g. ASE noise, ASE noise band, or an idler tone. As used herein "idler tones" shall refer to optical energy that is centered on a specific wavelength associated with a channel and that does not carry information or traffic.

Loading signals may be generated and placed at unutilized channels of terminals A, B and/or C by methods known to those of ordinary skill in the art. In an embodiment where one or more loading signals are broadband noise, the noise may be generated and added to unutilized channels, for example, as disclosed in U.S. Patent Application Publication Number 2005/0286905 A1, entitled "Optical Fiber Transmission System with Noise Loading", published Dec. 29, 2005, the teachings of which are hereby fully incorporated herein by reference. In an embodiment where one or more loading signals are idler tones, the idler tones may be generated, for example, by using a continuous-wave non-modulated laser source, as described for example in U.S. Patent Application Publication No. 2006/0051093 A1, entitled "System and Method for Spectral Loading an Optical Transmission System", published Mar. 9, 2006, the teachings of which are hereby fully incorporated herein by reference.

IB and OB loading signals impact channel power management different ways. OB loading signals are blocked by the filters in the OADM and hence only help channel power management in the trunk 102 or branch 104 path prior to the OADM. However, IB loading signals propagate all the way from the transmit terminal to the receive terminal and help channel power management within for entirety of the associated DLS.

Turning again to FIG. 1, the "X"s illustrated therein identify the potential locations of four different fiber faults F1, F2, F3 and F4. Fault F1 is a trunk path 102 fiber cut in front of the last amplifier 110 before the OADM, fault F2 is a trunk path 102 fiber cut in front of the OADM, fault F3 is a branch path 104 fiber cut in front of the OADM, and fault F4 is a branch path 104 fiber cut in front of the last amplifier 110 before the OADM. Loss of trunk channels resulting from faults $F_1$ and $F_2$ will result in a performance penalty for the add channels on DLS B-C. Loss of add channels on the branch path resulting from faults $F_3$ and $F_4$ will result in a performance penalty for the express channels on DLS A-C. In the illustrated exemplary embodiment, a fiber fault in the trunk path 102 after OADM, i.e. between the OADM and terminal C, does not require recovery in a manner consistent with the present disclosure since only DLS A-C and DLS B-C are directly impacted by the fault and introduce no penalty to channels of the DLS A-B.

In a system consistent with the present disclosure recovery from a fault, e.g. F1, F2, F3 or F4, may be accomplished by modifying the channel power distribution on DLSs impacted by the fault to minimize a merit function. The merit function may be based, for example, on system parameters, such as optical signal-to-noise ratio (OSNR) and/or nonlinear phase-shift. The merit function can be provided in a variety of configurations based on any system parameter of interest. Minimizing the merit function may effectively minimize the change in the system parameter(s) on which the merit function is based compared to the nominal design.

To assist in recovery, power adjustment may involve modifying power in IB loading signals. If the system is fully loaded with utilized channels one or more data/utilized channels may be changed to IB loading channels. This can be achieved by disabling data modulators and replacing information signals provided on the channels with loading signals. The power distribution between remaining data/utilized channels, and the IB and OB loading channels may be readjusted to minimize the merit function. Optionally, individual data channel power may be separately readjusted to further improve system performance.

Power distribution on DLSs impacted by the fault may be adjusted to minimize a merit function in a variety of ways. In one embodiment, for example, two power ratios in the recovering DLS(s) may be adjusted to minimize the value of a merit function based on optical signal-to-noise ratio (OSNR) and non-linear phase shift. For example, the ratio of total power of all data channels to the total launched power, $r_1$, and the ratio of total power of all IB loading channels to the total power of all loading channels, $r_2$, may be calculated as:

$$r_1 = \frac{\sum P_{sig}}{P_{launch}} = \frac{\sum P_{sig}}{\sum P_{sig} + \sum P_{IB} + \sum P_{OB}}, r_2 = \frac{\sum P_{IB}}{\sum P_{IB} + \sum P_{OB}} \quad (1)$$

where $P_{sig}$, $P_{IB}$, $P_{OB}$ and $P_{launch}$ are data/utilized channel power, IB loading signal power, OB loading signal power and total launched power, respectively. All powers are determined at the output of transmit terminal. The values of ratios $r_1$ and $r_2$ fall between 0 and 1.

The power ratios $r_1$ and $r_2$ may be adjusted to minimize the value of a merit function $\epsilon$, defined as:

$$\varepsilon = \sqrt{\frac{\sum_{sig}\left(\frac{OSNR - OSNR_0}{OSNR_0}\right)^2 + w\sum_{sig}\left(\frac{NL - NL_0}{NL_0}\right)^2}{1 + w}} \quad (2)$$

where OSNR is the optical signal-to-noise ratio in the receiver bandwidth, NL is the total accumulated non-linear phase shift, and w is the weighting of NL change in the merit function. The optimal value of w is system-dependent and should be chosen by trial-and-error for different systems. Subscripts of 0 refer to OSNR and NL values that correspond to the nominal (as-designed) system before the fault. The NL parameter may be defined as $$NL = \sum_{span} \frac{2\pi n_2}{A_{eff} \upsilon} P_{ch} L_{eff} \quad (3)$$

where $n_2$ is fiber non-linear refractive index, $A_{eff}$ is fiber effective area, $\upsilon$ is signal channel frequency, $P_{ch}$ is channel power, and $L_{eff}$ is fiber span effective length.

The power ratios $r_1$ and $r_2$ that minimize the merit function $\epsilon$ may be found using a known non-linear optimization algorithm, such as a Nelder-Mead algorithm. Calculations may be performed by processors located at the terminals A, B and/or C in real time. Calculations may also be performed at design or deployment time on all possible fault scenarios if loading conditions are already known at such time. Power ratio $r_1$ and $r_2$ adjustments may be performed automatically by transponders in the terminals in response to a fault detected by line monitoring equipment (not shown) in the terminals. By adjusting only the two power ratios $r_1$ and $r_2$, while maintaining the relative power levels of data channels, the time needed to find the ratios that minimize the merit function $\epsilon$ is greatly reduced. This approach to fault recovery may be initiated to restore traffic on as many channels as possible in a short period of time. If needed, fine adjustment of power levels of individual data channels can be implemented to individually maximize the performance of each channel.

Figure 6:
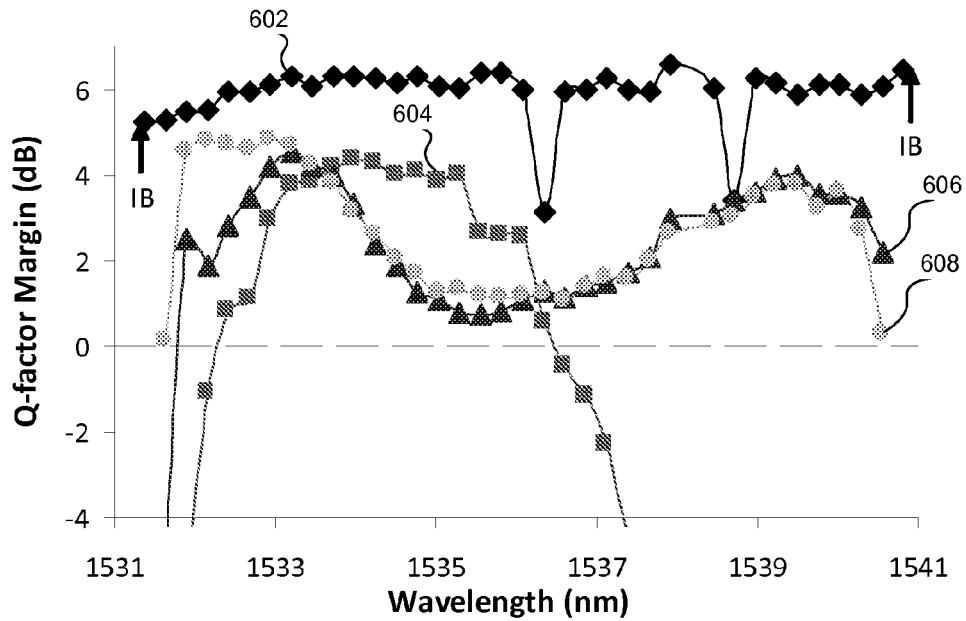
FIG. 6 includes plots of Q-factor margin vs. wavelength illustrating performance of fault recovery in a system consistent with the present disclosure.

FIG. 6 includes measured plots 602, 604, 606 and 608 of Q-factor margin vs. wavelength illustrating performance of fault recovery in a system consistent with the present disclosure. A positive Q-factor margin for a channel indicates the channel is operating normally. Plot 602 illustrates the as-designed (nominal) system performance, plot 604 illustrates the system performance after occurrence of a fault and before fault recovery, plot 606 illustrates the system performance after initial fault recovery consistent with the present disclosure, and plot 608 illustrates the system performance after initial fault recovery and individual data channel adjustments consistent with the present disclosure. The data plotted in FIG. 6 was obtained from a system configuration, as illustrated in FIG. 1, with dispersion managed trunk 102 and branch 104 paths and a 40 Gbps dual-wavelength binary phase shift keying (BPSK) transponders in the terminals A, B and C employing direct detection. At terminal A, 126 channels (2×20 Gbps channels represent one 40 Gbps signal) were loaded in a system bandwidth from 1531.702 nm to 1564.407 nm and launched onto the trunk path 102. The OADM was configured to drop 46 channels occupying wavelengths from 1531.702 nm to 1540.755 nm (spaced by 25 GHz) on the branch drop path 108 to terminal B. An express filter 204 (FIG. 2) in the OADM was used to pass the express channels and block the portion of the system bandwidth occupied by drop channels, so that it could be re-used for the add channels. At terminal B, 36 channels from 1531.376 nm to 1540.821 nm (on 33 GHz grid) were launched onto the branch add path 106 and combined at the OADM with 80 express channels from terminal A (also on 33 GHz grid).

Figure 7:
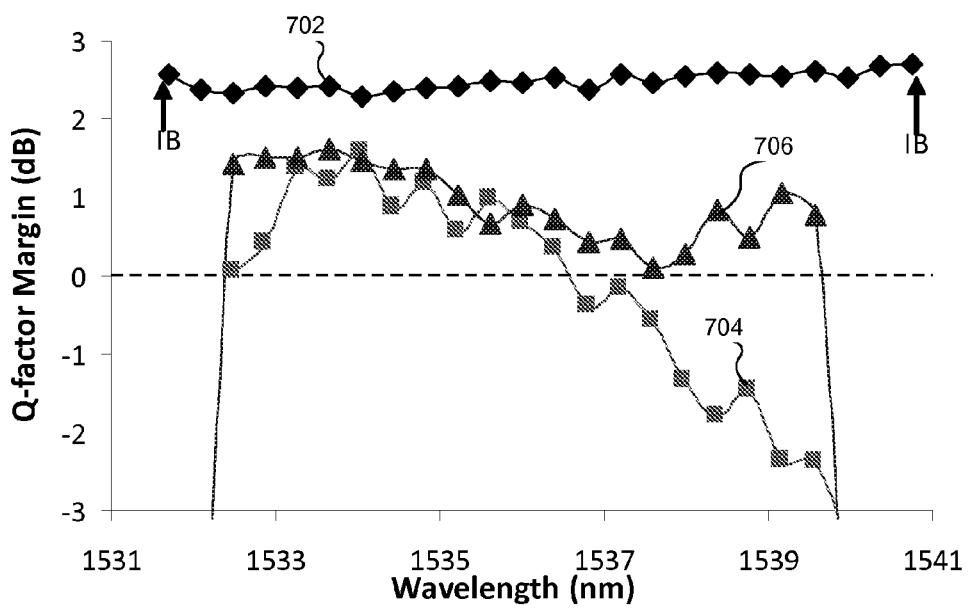
FIG. 7 includes plots of Q-factor margin vs. wavelength illustrating performance of fault recovery in another system consistent with the present disclosure.

FIG. 7 includes measured plots 702, 704 and 708 of Q-factor margin vs. wavelength illustrating performance of fault recovery in another system consistent with the present disclosure. Plot 702 illustrates the as-designed (nominal) system performance, plot 704 illustrates the system performance after occurrence of a fault and before fault recovery and plot 706 illustrates the system performance after initial fault recovery consistent with the present disclosure. The data plotted in FIG. 7 was obtained from a system configuration, as illustrated in FIG. 1, without dispersion management in the trunk 102 and branch 104 paths and 100 Gbps polarization multiplexed (PM) quadrature phase shift keying (QPSK) transponders in the terminals A, B and C employing coherent detection. At terminal A, 79 channels spaced on a 50 GHz grid were launched onto the trunk path 102. The OADM was configured to drop 23 channels from the trunk path 102 to the branch drop path 108. At terminal B, 23 channels on the same wavelengths as the dropped channels were launched onto the branch add path 106 and added at the OADM to the trunk path 102 along with the express channels. The express, add and drop channels occupied the same wavelength ranges as described above in connection with FIG. 6.

For both the 40 Gbps (FIG. 6) and 100 Gbps (FIG. 7) systems, a trunk cut fault was inserted immediately before the OADM (as shown by $F_2$ in FIG. 1) since that fault resulted in the largest impact on the performance of remaining DLSs. Since both systems were fully loaded, fault recovery consistent with the present disclosure was achieved in the systems by changing the two edge channels of the DLS B-C (the longest and the shortest wavelength) to IB loading signals, as illustrated in plots 602 and 702. More IB loading could be used to help reduce channel power and further lower performance impairments caused by fiber nonlinearities. After adjusting the power ratios $r_1$ and $r_2$ to minimize the merit function $\epsilon$, as described above, the bit error rate (BER) and Q-factor of the signal channels were calculated. To calculate the merit function $\epsilon$, w=0.4 and w=0 were selected for the 40 Gbps (FIG. 6) and 100 Gbps (FIG. 7), respectively.

As illustrated by plot 602 of FIG. 6, the 40 Gbps system had ~6 dB margin as designed. After the trunk cut, only 16 of the 36 channels have positive Q-factor margin as illustrated by plot 604, or 44% of original capacity. Plot 606 illustrates that fault recovery consistent with the present disclosure successfully recovered 17 additional channels, retaining 92% of capacity. As illustrated by plot 608, the last failed channel can be recovered by adjusting individual data channel power, restoring all traffic on the DLS except for the two used as IB idlers.

As illustrated by plot 702 of FIG. 7, the 100 Gbps system had an as-designed margin of ~2.5 dB on the 23 channels of DLS B-C. After the fiber cut, as illustrated by plot 704, 11 channels (47%) remain operational. Plot 706 illustrates that 8 additional channels can be recovered using fault recovery consistent with the present disclosure, retaining 83% of capacity.

Minimizing the merit function in both the 40 Gbps (FIG. 6) and 100 Gbps (FIG. 7) systems resulted in lowering $r_1$ while increasing $r_2$ compared with their respective initial values (after the fault before recovery). This generally corresponds to redistributing power from data channels (that had excess power after the fault) and OB loading signals to IB loading signals.

There is thus provided a system and method for providing recovery from a fault in an undersea OADM network. Recovery may be accomplished by adjusting two power ratios between data channels and loading channels to minimize a merit function calculated from system parameters. Advantageously, a system and method consistent with the present disclosure allows recovery of most of the data channels on OADM DLSs not directly affected by the fault. Loading signals to be used for recovery are always present in case of partial loading, but in a fully loaded system, a few data channels may be changed to unutilized channels with loading signals thereon by disabling data modulation. A system and method consistent with the present disclosure provides efficient utilization of the system bandwidth and successful recovery in case of a cable cut.

Figure 8:
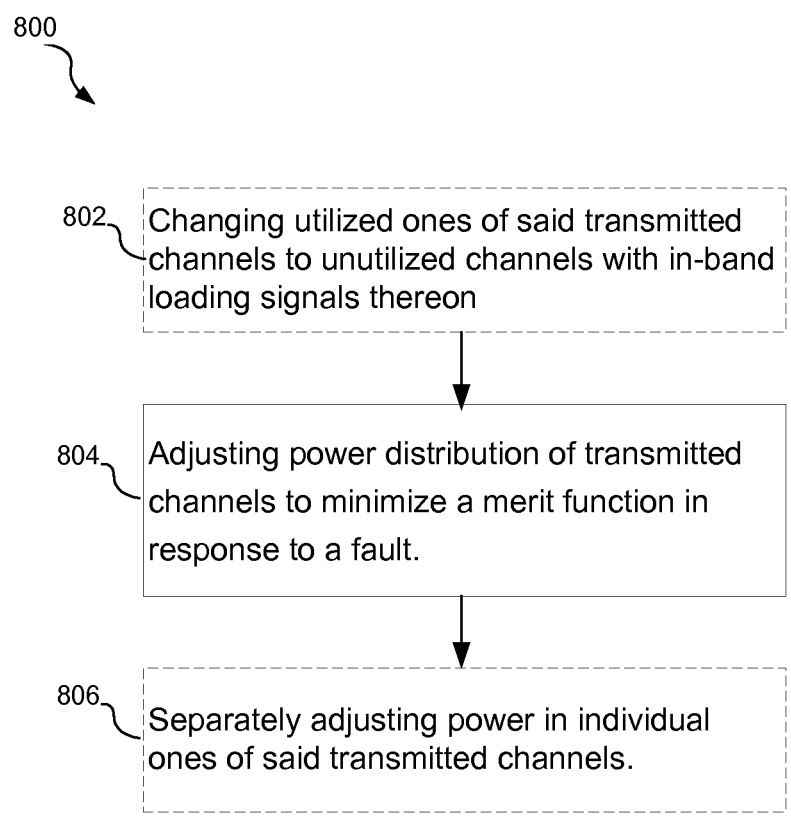
FIG. 8 is flow chart illustrating one example of a method consistent with the present disclosure.

FIG. 8 is a flow chart illustrating a method 800 consistent with the present disclosure. As shown, in response to fault, power distribution of transmitted channels may be adjusted 804 to minimize a merit function. If the transmitted channels are all utilized channels, some of the transmitted channels may be changed 802 to unutilized channels with in-band loading signals thereon before adjusting power distribution in the transmitted channels. For further improvement, power in individual ones of the transmitted channels may be separately adjusted 806 after adjusting power distribution in the transmitted channels.

While FIG. 8 illustrates various operations according to an embodiment, it is to be understood that not all of the operations depicted in FIG. 8 are necessary for other embodiments. Indeed, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the disclosure there is provided a wavelength division multiplexed optical system including: a first trunk terminal configured to provide a trunk input signal on a trunk path, the trunk input signal occupying a plurality of express channels and a plurality of drop channels; a branch terminal configured to provide a branch input signal on a branch path, the branch input signal occupying a plurality of add channel channels; an optical add-drop multiplexer (OADM) coupled to the trunk path and the branch path for receiving the trunk input signal and the branch input signal and providing a trunk output signal on the trunk path and a branch output signal on the branch path, the trunk output signal including the express channels and the add channels, the branch input signal including the drop channels; and a second trunk terminal coupled to the OADM and configured to receive the trunk output signal; at least one of the first trunk terminal and the branch terminal being configured to adjust an output power of the trunk input signal or the branch input signal, respectively, to minimize a merit function to recover from a fault on the trunk path or the branch path.

According to another aspect of the disclosure, there is provided a method for fault recovery in a branched WDM optical network including: adjusting power distribution of transmitted channels to minimize a merit function in response to a fault.

Embodiments of the methods described herein may be implemented using a processor and/or other programmable device. To that end, the methods described herein may be implemented on a tangible, computer readable storage medium having instructions stored thereon that when executed by one or more processors perform the methods. Thus, for example, the terminals A, B and/or C may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A wavelength division multiplexed optical system comprising:
    a first trunk terminal configured to provide a trunk input signal on a trunk path, said trunk input signal occupying a plurality of express channels and a plurality of drop channels;
    a branch terminal configured to provide a branch input signal on a branch path, said branch input signal occupying a plurality of add channel channels;
    an optical add-drop multiplexer (OADM) coupled to said trunk path and said branch path for receiving said trunk input signal and said branch input signal and providing a trunk output signal on said trunk path and a branch output signal on said branch path, said trunk output signal comprising said express channels and said add channels, said branch input signal comprising said drop channels; and
    a second trunk terminal coupled to said OADM and configured to receive said trunk output signal;
    at least one of said first trunk terminal and said branch terminal being configured to adjust an output power of said trunk input signal or said branch input signal, respectively, to minimize a merit function to recover from a fault on said trunk path or said branch path,
    wherein said at least one of said first trunk terminal and said branch terminal is configured to adjust first and second power ratios in said trunk input signal or said branch input signal, respectively, to minimize said merit function,
    wherein said first power ratio is expressed as:

$$r_1 = \frac{\sum P_{sig}}{P_{launch}} = \frac{\sum P_{sig}}{\sum P_{sig} + \sum P_{IB} + \sum P_{OB}}$$

and wherein said second power ratio is expressed as:

$$r_2 = \frac{\sum P_{IB}}{\sum P_{IB} + \sum P_{OB}}$$

where $P_{sig}$, $P_{IB}$, $P_{OB}$ and $P_{launch}$ are utilized channel power, in-band loading signal power, out-of-band loading signal power, and total launched power, respectively, of the trunk input signal or said branch input signal.

2. A system according to claim 1, wherein said merit function is expressed as:

$$\varepsilon = \sqrt{\frac{\sum_{sig}\left(\frac{OSNR - OSNR_0}{OSNR_0}\right)^2 + w\sum_{sig}\left(\frac{NL - NL_0}{NL_0}\right)^2}{1 + w}}$$

where OSNR is a received optical signal-to-noise ratio, $OSNR_0$ is a nominal received optical signal-to-noise ratio, NL is a total accumulated non-linear phase shift, $NL_0$ is a nominal total accumulated non-linear phase shift, and w is a weighting factor.

3. A system according to claim 1, wherein said first trunk terminal or said branch terminal is configured to change utilized channels of said trunk input signal or said branch input signal, respectively, to unutilized channels with in-band loading signals thereon.

4. A system according to claim 1, wherein said first trunk terminal or said branch terminal is further configured to separately adjust individual channel powers in said trunk input signal or said branch input signal, respectively.

5. A system according to claim 1, wherein said merit function is based on optical signal-to-noise ratio and non-linear phase shift.

6. A system according to claim 1, wherein said merit function is expressed as:

$$\varepsilon = \sqrt{\frac{\sum_{sig}\left(\frac{OSNR - OSNR_0}{OSNR_0}\right)^2 + w\sum_{sig}\left(\frac{NL - NL_0}{NL_0}\right)^2}{1 + w}}$$

where OSNR is a received optical signal-to-noise ratio, $OSNR_0$ is a nominal received optical signal-to-noise ratio, NL is a total accumulated non-linear phase shift, $NL_0$ is a nominal total accumulated non-linear phase shift, and w is a weighting factor.

7. A method for fault recovery in a branched WDM optical network comprising: adjusting power distribution of transmitted channels to minimize a merit function in response to a fault; separately adjusting power in individual transmitted channels to minimize the merit function, said adjusting comprising adjusting first and second power ratios in said transmitted channels,
wherein said first power ratio is expressed as:

$$r_1 = \frac{\Sigma Psig}{Plaunch} = \frac{\Sigma Psig}{\Sigma Psig + \Sigma IB + \Sigma POB}$$

and wherein said second power ratio is expressed as:

$$r_2 = \frac{\Sigma PIB}{\Sigma IB + \Sigma POB}$$

where $P_{sig}$, $P_{IB}$, $P_{OB}$ and $P_{launch}$ are utilized channel power, in-band loading signal power, out-of-band loading signal power, and total launched power, respectively, of said transmitted channels.

8. A method according to claim 7, wherein said merit function is expressed as:

$$\varepsilon = \sqrt{\frac{\sum_{sig}\left(\frac{OSNR - OSNR_0}{OSNR_0}\right)^2 + w\sum_{sig}\left(\frac{NL - NL_0}{NL_0}\right)^2}{1 + w}}$$

where OSNR is a received optical signal-to-noise ratio, $OSNR_0$ is a nominal received optical signal-to-noise ratio, NL is a total accumulated non-linear phase shift, $NL_0$ is a nominal total accumulated non-linear phase shift, and w is a weighting factor.

9. A method according to claim 7, said method further comprising changing utilized ones of said transmitted channels to unutilized channels with in-band loading signals thereon.

10. A method according to claim 7, wherein said merit function is based on optical signal-to-noise ratio and non-linear phase shift.

11. A method according to claim 7, wherein said merit function is expressed as:

$$\varepsilon = \sqrt{\frac{\sum_{sig}\left(\frac{OSNR - OSNR_0}{OSNR_0}\right)^2 + w\sum_{sig}\left(\frac{NL - NL_0}{NL_0}\right)^2}{1 + w}}$$

where OSNR is a received optical signal-to-noise ratio, $OSNR_0$ is a nominal received optical signal-to-noise ratio, NL is a total accumulated non-linear phase shift, $NL_0$ is a nominal total accumulated non-linear phase shift, and w is a weighting factor.

12. A wavelength division multiplexed optical system comprising:
a first trunk terminal configured to provide a trunk input signal on a trunk path, said trunk input signal occupying a plurality of express channels and a plurality of drop channels;
a branch terminal configured to provide a branch input signal on a branch path, said branch input signal occupying a plurality of add channel channels;
an optical add-drop multiplexer (OADM) coupled to said trunk path and said branch path for receiving said trunk input signal and said branch input signal and providing a trunk output signal on said trunk path and a branch output signal on said branch path, said trunk output signal comprising said express channels and said add channels, said branch input signal comprising said drop channels; and
a second trunk terminal coupled to said OADM and configured to receive said trunk output signal;
at least one of said first trunk terminal and said branch terminal being configured to adjust an output power of said trunk input signal or said branch input signal, respectively, to minimize a merit function to recover from a fault on said trunk path or said branch path,
wherein said merit function is expressed as:

$$\varepsilon = \sqrt{\frac{\sum_{sig}\left(\frac{OSNR - OSNR_0}{OSNR_0}\right)^2 + w\sum_{sig}\left(\frac{NL - NL_0}{NL_0}\right)^2}{1 + w}}$$

where OSNR is a received optical signal-to-noise ratio, $OSNR_0$ is a nominal received optical signal-to-noise ratio, NL is a total accumulated non-linear phase shift, $NL_0$ is a nominal total accumulated non-linear phase shift, and w is a weighting factor.

13. A method for fault recovery in a branched WDM optical network comprising: adjusting power distribution of transmitted channels to minimize a merit function in response to a fault; separately adjusting power in individual transmitted channels to minimize the merit function, wherein said merit function is expressed as:

$$\varepsilon = \sqrt{\frac{\sum_{sig}\left(\frac{OSNR - OSNRo}{OSNRo}\right)^2 + w\sum_{sig}\left(\frac{NL - NLo}{NLo}\right)^2}{1 + w}}$$

where OSNR is a received optical signal-to-noise ratio, OSNRo is a nominal received optical signal-to-noise ratio, NL is a total accumulated non-linear phase shift, NLo is a nominal total accumulated non-linear phase shift, and w is a weighting factor.

* * * * *